(12) United States Patent
Ohashi

(10) Patent No.: US 11,201,477 B2
(45) Date of Patent: Dec. 14, 2021

(54) ELECTRIC DEVICE FOR SUPPLYING MULTIPLE POWER OUTPUTS AND RECHARGING MULTIPLE SUPPLY BATTERIES HAVING DIFFERENT OPERATING VOLTAGES

(71) Applicant: Sony Interactive Entertainment Inc., Tokyo (JP)

(72) Inventor: Tsuyoshi Ohashi, Tokyo (JP)

(73) Assignee: Sony Interactive Entertainmnt Inc., Tokyo (JP)

( * ) Notice: Subject to any disclaimer, the term of this patent is extended or adjusted under 35 U.S.C. 154(b) by 199 days.

(21) Appl. No.: 16/473,294

(22) PCT Filed: Dec. 26, 2017

(86) PCT No.: PCT/JP2017/046546
§ 371 (c)(1),
(2) Date: Jun. 25, 2019

(87) PCT Pub. No.: WO2018/128119
PCT Pub. Date: Jul. 12, 2018

(65) Prior Publication Data
US 2020/0006957 A1    Jan. 2, 2020

(30) Foreign Application Priority Data

Jan. 5, 2017 (JP) .............................. JP2017-000660

(51) Int. Cl.
*H02J 7/00* (2006.01)
*H02J 7/34* (2006.01)
*H01M 10/44* (2006.01)

(52) U.S. Cl.
CPC ......... *H02J 7/0014* (2013.01); *H01M 10/441* (2013.01); *H02J 7/342* (2020.01)

(58) Field of Classification Search
CPC ....... H02J 7/0014; H02J 7/342; H01M 10/441
(Continued)

(56) References Cited

U.S. PATENT DOCUMENTS 6,794,846 B2 * 9/2004 Tsuji ....................... H02M 7/48
320/103
7,298,113 B2 * 11/2007 Orikasa ................. H01M 10/46
320/112

(Continued)

FOREIGN PATENT DOCUMENTS

EP    2903124 A1    8/2015
EP    3051657 A1    8/2016
(Continued)

OTHER PUBLICATIONS

Extended European Search Report for corresponding EP Application No. 17890798.6, 7 pages, dated Jun. 2, 2020.
(Continued)

*Primary Examiner* — John T Trischler
(74) *Attorney, Agent, or Firm* — Matthew B. Dernier

(57) ABSTRACT

An electric device includes a first rechargeable battery and a second rechargeable battery that is lower, in a full charge voltage, than the first rechargeable battery; a first power source circuit that steps down a voltage output by the first rechargeable battery to a first voltage and outputs the first voltage; and a second power source circuit that steps down a voltage output by the second rechargeable battery to a second voltage that is lower than the first voltage and outputs the second voltage.

7 Claims, 2 Drawing Sheets

(58) Field of Classification Search
USPC .................................................. 320/103
See application file for complete search history.

(56) References Cited

U.S. PATENT DOCUMENTS

| | | | | |
|---|---|---|---|---|
| 8,030,880 B2* | 10/2011 | Alston | ................ | H01M 10/482 |
| | | | | 320/103 |
| 8,395,355 B2* | 3/2013 | Kaita | ................ | B60L 58/15 |
| | | | | 320/134 |
| 8,682,517 B2* | 3/2014 | Iida | ................ | H02J 7/0016 |
| | | | | 701/22 |
| 8,760,111 B2* | 6/2014 | Endo | ................ | H02J 7/0019 |
| | | | | 320/103 |
| 9,710,033 B2 | 7/2017 | Yamazaki | | |
| 9,785,212 B2* | 10/2017 | Hirosawa | ................ | H02J 7/342 |
| 9,800,064 B2* | 10/2017 | Hwang | ................ | H02J 7/0021 |
| 9,809,126 B2* | 11/2017 | Nakazawa | ................ | B60L 58/20 |
| 10,103,561 B2* | 10/2018 | Ide | ................ | B60L 3/0092 |
| 10,139,879 B2* | 11/2018 | Yamazaki | ................ | G06F 1/263 |
| 10,183,587 B2* | 1/2019 | Unno | ................ | B60L 58/25 |
| 10,205,334 B2* | 2/2019 | Unno | ................ | B60L 50/51 |
| 10,250,059 B2* | 4/2019 | Aldehayyat | ................ | H02J 7/0068 |
| 10,421,462 B2* | 9/2019 | Lin | ................ | B60L 3/0061 |
| 10,523,026 B2* | 12/2019 | Matsushita | ................ | H02J 7/0068 |
| 10,727,678 B2* | 7/2020 | Zou | ................ | H02J 7/0014 |
| 10,809,784 B2* | 10/2020 | Yamazaki | ................ | G06F 3/0488 |
| 2008/0036419 A1* | 2/2008 | Cook | ................ | H02J 7/0031 |
| | | | | 320/104 |
| 2008/0290834 A1* | 11/2008 | Umetsu | ................ | H02J 7/0013 |
| | | | | 320/107 |
| 2009/0107743 A1* | 4/2009 | Alston | ................ | H02J 7/1423 |
| | | | | 180/65.21 |
| 2010/0019729 A1* | 1/2010 | Kaita | ................ | B60L 58/15 |
| | | | | 320/134 |
| 2010/0097031 A1* | 4/2010 | King | ................ | B60L 53/22 |
| | | | | 320/109 |
| 2012/0062167 A1* | 3/2012 | Hachiya | ................ | B60L 58/20 |
| | | | | 320/103 |
| 2012/0086276 A1* | 4/2012 | Sawyers | ................ | H02J 1/12 |
| | | | | 307/66 |
| 2013/0038270 A1* | 2/2013 | Endo | ................ | H02J 7/0019 |
| | | | | 320/103 |
| 2014/0009105 A1* | 1/2014 | Keates | ................ | H01M 10/482 |
| | | | | 320/103 |
| 2014/0184140 A1* | 7/2014 | Lee | ................ | H02M 3/1582 |
| | | | | 320/103 |
| 2015/0069950 A1* | 3/2015 | Ishibashi | ................ | H02J 3/385 |
| | | | | 320/101 |
| 2015/0214770 A1* | 7/2015 | Chen | ................ | H02J 2207/20 |
| | | | | 307/19 |
| 2015/0248149 A1 | 9/2015 | Yamazaki | | |
| 2016/0079751 A1* | 3/2016 | Ide | ................ | H02J 7/342 |
| | | | | 307/52 |
| 2016/0087545 A1* | 3/2016 | Higaki | ................ | H02J 7/342 |
| | | | | 363/17 |
| 2016/0134137 A1* | 5/2016 | Hirosawa | ................ | G06F 1/26 |
| | | | | 320/160 |
| 2016/0226269 A1* | 8/2016 | Hwang | ................ | B60L 58/13 |
| 2016/0355189 A1* | 12/2016 | Lin | ................ | B60L 3/0061 |
| 2017/0210240 A1* | 7/2017 | Unno | ................ | B60L 11/1859 |
| 2017/0217313 A1* | 8/2017 | Hashimoto | ................ | H02J 1/00 |
| 2017/0228002 A1* | 8/2017 | Yamazaki | ................ | G06F 1/1635 |
| 2017/0232851 A1* | 8/2017 | Unno | ................ | B60L 58/20 |
| | | | | 307/10.1 |
| 2018/0219397 A1* | 8/2018 | Matsushita | ................ | B60L 58/12 |
| 2018/0252774 A1* | 9/2018 | Ciaccio | ................ | H01M 10/625 |
| 2019/0009682 A1* | 1/2019 | Zou | ................ | B60L 53/665 |
| 2019/0107876 A1* | 4/2019 | Yamazaki | ................ | G06F 1/1635 |
| 2019/0356134 A1* | 11/2019 | Ohashi | ................ | H02J 7/0003 |
| 2019/0356157 A1* | 11/2019 | Ohashi | ................ | H01M 10/441 |
| 2020/0086755 A1* | 3/2020 | Maruyama | ................ | B60L 50/51 |
| 2020/0091750 A1* | 3/2020 | Matsushita | ................ | H02J 1/108 |
| 2020/0099236 A1* | 3/2020 | Ohashi | ................ | H02J 7/00 |
| 2020/0112260 A1* | 4/2020 | Suzuki | ................ | H02M 3/33569 |
| 2020/0295660 A1* | 9/2020 | Oguma | ................ | H02J 7/005 |
| 2020/0321797 A1* | 10/2020 | Gerrits | ................ | H02J 7/0027 |
| 2020/0393883 A1* | 12/2020 | Yamazaki | ................ | G06F 3/0446 |
| 2020/0393884 A1* | 12/2020 | Yamazaki | ................ | G06F 1/1652 |

FOREIGN PATENT DOCUMENTS

| | | |
|---|---|---|
| JP | 118942 A | 1/1999 |
| JP | 2006121874 A | 5/2006 |
| JP | 2015077036 A | 4/2015 |
| JP | 2015180993 A | 10/2015 |
| JP | 2015198474 A | 11/2015 |

OTHER PUBLICATIONS

International Preliminary Report on Patentability and Written Opinion for corresponding PCT Application No. PCT/JP2017/046546, 14 pages, dated Jul. 18, 2019.
Notice of Reasons for Refusal for corresponding JP Application No. 2018-560372, 8 pages, dated May 7, 2020.
International Search Report for corresponding PCT Application No. PCT/JP2017/046546, 4 pages, dated Jan. 30, 2018.

* cited by examiner

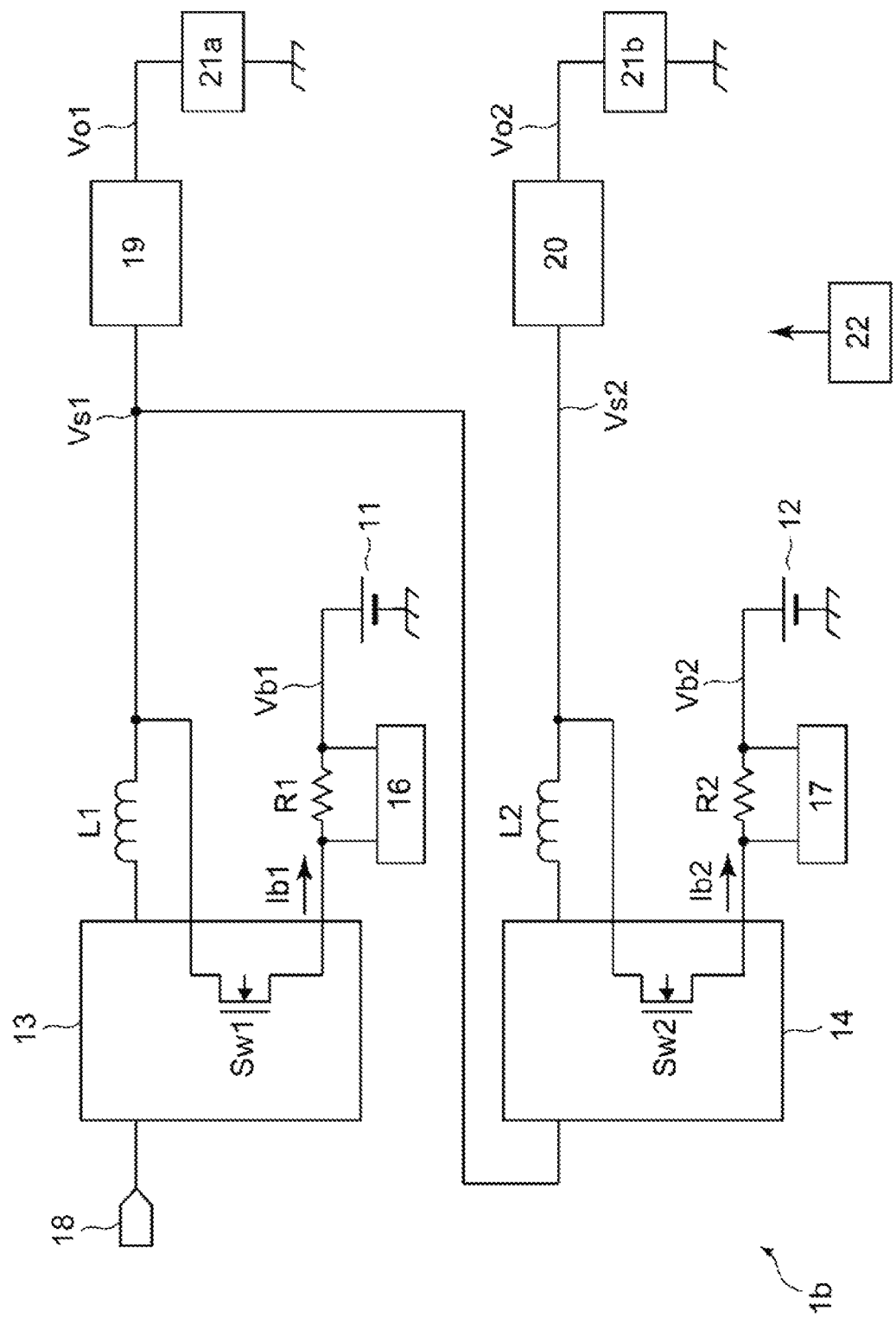
F I G . 2

ELECTRIC DEVICE FOR SUPPLYING MULTIPLE POWER OUTPUTS AND RECHARGING MULTIPLE SUPPLY BATTERIES HAVING DIFFERENT OPERATING VOLTAGES

TECHNICAL FIELD

The present invention relates to an electric device using a plurality of kinds of rechargeable batteries.

BACKGROUND ART

Some electric devices that consume power supplied from a rechargeable battery capable of charging and operate include a plurality of kinds of loads that are operated in various voltages. The above electric device steps up or steps down a voltage supplied from a rechargeable battery in accordance with an operating voltage of each load and thereby allows various loads to be operated.

SUMMARY

Technical Problem

In a case in which the step-down control described above is performed, as a potential difference between an input voltage and an output voltage grows larger, thermal loss generated when performing the step-down grows larger. When the thermal loss grows large, a device generates heat. Therefore, it is necessary to make a chassis size large to prevent the heat generation or restrict functions or performances of an electric device in order to reduce power consumption.

The present invention has been made in view of the above circumstances. An object of the present invention is therefore to provide an electric device capable of allowing various loads to be operated with relatively small thermal loss.

Solution to Problem

The electric device according to the present invention is an electric device incorporating a first rechargeable battery and a second rechargeable battery that is lower, in a full charge voltage, than the first rechargeable battery, and includes: a first power source circuit stepping down a voltage output by the first rechargeable battery to a first voltage and outputting the first voltage; and a second power source circuit stepping down a voltage output by the second rechargeable battery to a second voltage that is lower than the first voltage and outputting the second voltage.

BRIEF DESCRIPTION OF DRAWINGS

FIG. 2 is a diagram illustrating a circuit configuration of an electric device according to a second embodiment of the present invention.

DESCRIPTION OF EMBODIMENTS

Figure 1:
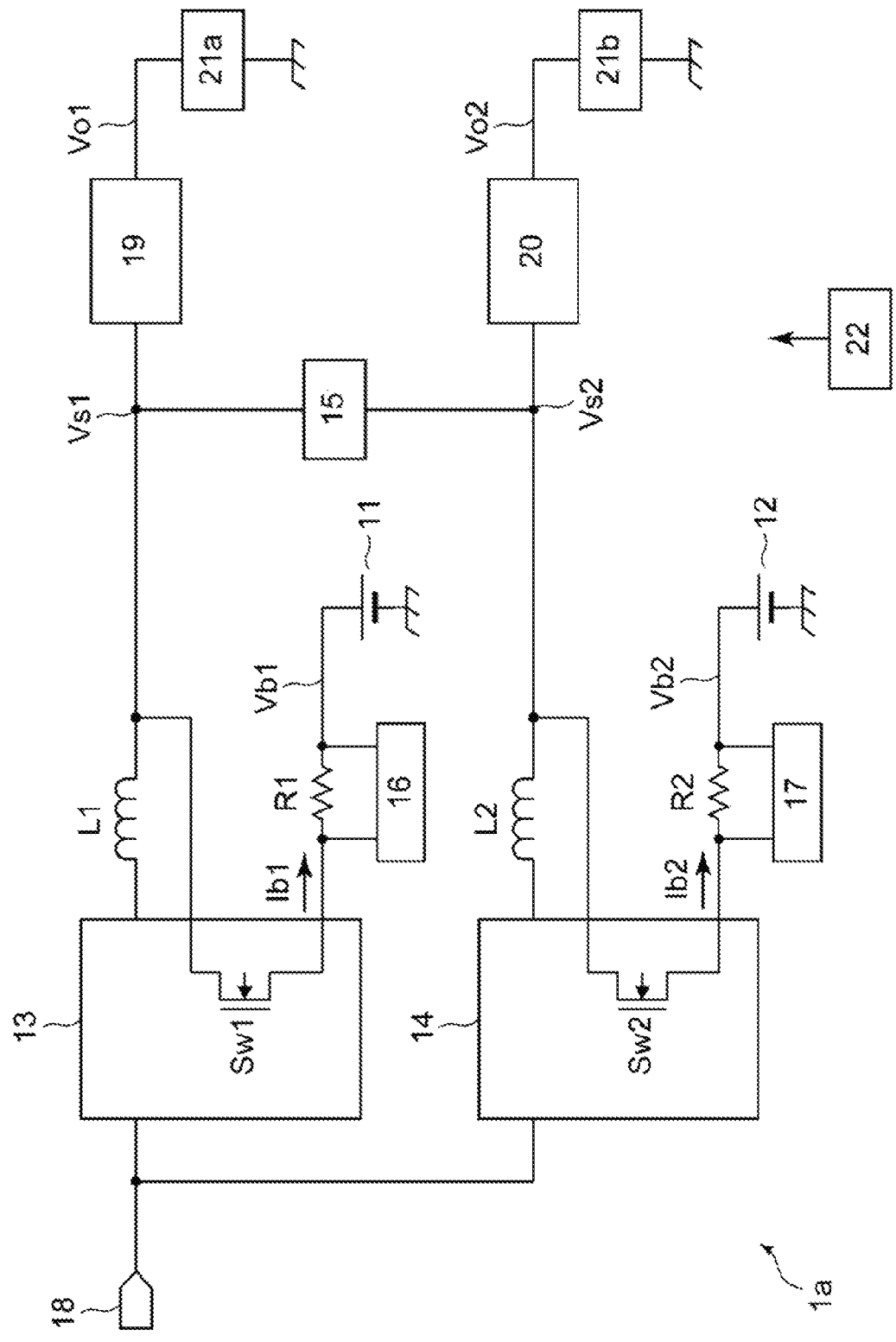
FIG. 1 is a diagram illustrating a circuit configuration of an electric device according to a first embodiment of the present invention.

Hereinafter, preferred embodiments of the present invention will be described in detail with reference to the appended drawings.

First Embodiment

FIG. 1 is a diagram illustrating a rough circuit configuration of an electric device 1a according to a first embodiment of the present invention. As illustrated in the diagram, the electric device 1a can incorporate a first rechargeable battery 11 and a second rechargeable battery 12 and includes a first rechargeable circuit 13, a second rechargeable circuit 14, a third rechargeable circuit 15, a first capacity calculation circuit 16, a second capacity calculation circuit 17, a power source terminal 18, a first power source circuit 19, a second power source circuit 20, loads 21a and 21b, and a control circuit 22. The electric device 1a according to the present embodiment may be various devices that operate by power supplied from a rechargeable battery, including an electric tool, an electric vehicle, a storage battery, an aircraft, a mobile device such as a cell-phone, and a head-mounted display.

The first rechargeable battery 11 and the second rechargeable battery 12 are a secondary battery that can be repeatedly charged/discharged such as a lithium-ion battery or a magnesium sulfur battery, and the electric device 1a operates by power supplied from the above rechargeable batteries.

In the present embodiment, it is assumed that the first rechargeable battery 11 and the second rechargeable battery 12 differ from each other in a full charge voltage and an output voltage range. As one example, the first rechargeable battery 11 may be a lithium-ion battery in which the full charge voltage is 4.2 V and in which an output voltage falls within a range from 3.5 to 4.2 V. Further, the second rechargeable battery 12 may be a magnesium sulfur battery in which the full charge voltage is 2.0 V and in which the output voltage falls within a range from 1.5 to 2.0 V. Hereinafter, it is assumed that the first rechargeable battery 11 is larger than the second rechargeable battery 12 in the full charge voltage.

The first rechargeable circuit 13 is a circuit that charges the first rechargeable battery 11 and may be an integrated circuit such as a charging integrated circuit (IC). The first rechargeable circuit 13 includes a switching device Sw1 connected to the first rechargeable battery 11. The input side of the first rechargeable circuit 13 is connected to the power source terminal 18, and the output side thereof is connected to the first power source circuit 19 via a coil L1. Further, one end of the switching device Sw1 is connected to one end of the coil L1, and the other end of the switching device Sw1 is connected to the positive electrode side of the first rechargeable battery 11 via a resistor R1. The first rechargeable circuit 13 converts power supplied from an external supply source of power via the power source terminal 18 into a given voltage and supplies the voltage to the first rechargeable battery 11 to thereby charge the first rechargeable battery 11.

The second rechargeable circuit 14 is a circuit for charging the second rechargeable battery 12 and may be an integrated circuit such as a charging IC similarly to the first rechargeable circuit 13. The second rechargeable circuit 14 includes a switching device Sw2 connected to the second rechargeable battery 12. The input side of the second rechargeable circuit 14 is connected to the power source terminal 18, and the output side thereof is connected to the second power source circuit 20 via a coil L2. Further, one end of the switching device Sw2 is connected to one end of the coil L2, and the other end of the switching device Sw2 is connected to the positive electrode side of the second rechargeable battery 12 via a resistor R2. The second rechargeable circuit 14 converts the power supplied from the external supply source of power via the power source terminal 18 into a given voltage and supplies the voltage to the second rechargeable battery 12 to thereby charge the second rechargeable battery 12.

The third rechargeable circuit 15 may be an integrated circuit such as a charging IC having a step-up/down function. The third rechargeable circuit 15 is disposed between the output side of the first rechargeable circuit 13 and the output side of the second rechargeable circuit 14. Further, the third rechargeable circuit 15 implements charging of the second rechargeable battery 12 with power supplied from the first rechargeable battery 11 and the charging of the first rechargeable battery 11 with power supplied from the second rechargeable battery 12. A specific example of charging control by the third rechargeable circuit 15 will be described below.

The first capacity calculation circuit 16 and the second capacity calculation circuit 17 calculate battery capacities of corresponding rechargeable batteries, respectively. Specifically, the first capacity calculation circuit 16 is connected to the resistor R1 in parallel and measures a charging current Ib1 flowing in the first rechargeable battery 11 and a battery voltage Vb1 of the first charging battery 11. By using the above information, the first capacity calculation circuit 16 calculates the battery capacity of the first rechargeable battery 11 in a measuring point. Similarly, the second capacity calculation circuit 17 is connected to the resistor R2 in parallel and measures a charging current Ib2 flowing in the second rechargeable battery 12 and a battery voltage Vb2 of the second rechargeable battery 12. On the basis of results thereof, the second capacity calculation circuit 17 calculates the battery capacity of the second rechargeable battery 12.

The power source terminal 18 is a terminal connected to the external supply source of power (hereinafter, referred to as an external power supply). Via the power source terminal 18, power for charging the first rechargeable battery 11 and the second rechargeable battery 12 is supplied from the external power supply. To the power source terminal 18, for example, an AC adapter that converts power supplied from a commercial alternating-current power supply into a direct current to be output may be connected. Alternatively, to the power source terminal 18, an electric device corresponding to a supply of power, such as a universal serial bus (USB) host device, may be connected.

The first power source circuit 19 and the second power source circuit 20 respectively are circuits that supply power necessary for operating loads connected to thereto. Here, each power source circuit is assumed to be a DC/DC converter; however, not limited thereto, it may be a low drop out (LDO) or the like. The input side of the first power source circuit 19 is connected to the first rechargeable circuit 13, and the output side thereof is connected to the load 21*a*. Further, the first power source circuit 19 steps down a voltage Vs1 supplied from the first rechargeable battery 11 via the first rechargeable circuit 13 to a voltage Vo1 corresponding to the load 21*a* and outputs the voltage Vo1 to the load 21*a*. Similarly, the input side of the second power source circuit 20 is connected to the second rechargeable circuit 14, and the output side thereof is connected to the load 21*b*. Further, the second power source circuit 20 steps down a voltage Vs2 supplied from the second rechargeable battery 12 via the second rechargeable circuit 14 to a voltage Vo2 corresponding to the load 21*b* and outputs the voltage Vo2 to the load 21*b*. In the present embodiment, the first rechargeable battery 11 is larger than the second rechargeable battery 12 in the full charge voltage and the output voltage range. Therefore, the voltage Vs1 is normally larger than the voltage Vs2. In accordance with the above, as described below, the power source circuit that connects each load is determined such that the voltage Vo1 is made larger than the voltage Vo2.

The loads 21*a* and 21*b* respectively are circuit devices etc. for implementing functions of the electric device 1*a*. Further, the loads 21*a* and 21*b* may include various parts in accordance with a kind of the electric device 1*a* such as a motor or an integrated circuit. The load 21*a* is operated by power supplied from the first power source circuit 19, and the load 21*b* is operated by power supplied from the second power source circuit 20. Note that in a case in which the electric device 1*a* is a storage battery, or the like, a load that consumes power supplied from each rechargeable battery and is operated may be disposed outside the electric device 1*a*.

Particularly, in the present embodiment, it is assumed that the loads 21*a* and 21*b* are operated in voltages different from each other. Therefore, it is selected that each load is connected to which of the first power source circuit 19 and the second power source circuit 20 in accordance with respective operating voltages. Specifically, one load that is operated at an operating voltage Vo is connected to either of the power source circuits. In such a case, when a voltage supplied from the rechargeable battery to either of the power source circuits is set to Vs, the load is connected to one power source circuit in which Vs>Vo is satisfied and a potential difference (Vs−Vo) becomes smaller.

As one example, there is considered a case in which the output voltage range of the first rechargeable battery 11 is set to 4.2 to 3.5 V, the output voltage range of the second rechargeable battery 12 is set to 2.0 to 1.5 V, and a load of the operating voltage 1.2 V is operated. In a case in which the load is connected to the first power source circuit 19, the first power source circuit 19 is required to step down by 3.0 V at the maximum. However, in a case in which the load is connected to the second power source circuit 20, it is sufficient if the second power source circuit 20 steps down by 0.8 V even at the maximum. Therefore, the load is connected to the second power source circuit 20. By contrast, there is a possibility that when the load of the operating voltage 1.8 V is connected to the second power source circuit 20, a necessary voltage may not be secured if a battery voltage of the second rechargeable battery 12 is reduced. Therefore, the load is connected to the first power source circuit 19. As described above, by using the electric device 1*a* according to the present embodiment, power is supplied from two kinds of rechargeable batteries in which the full charge voltage and the output voltage range are different from each other. Further, each load is connected to the power source circuit such that a potential difference between the output voltage of the rechargeable battery and the operating voltage of each load is made small and thereby thermal loss that is generated in accordance with step-down control of the power source circuit can be reduced.

However, when two kinds of the rechargeable batteries are used together as described above, in a case in which the battery capacity of either of the rechargeable batteries is reduced, even if the battery capacity of the other rechargeable battery remains sufficiently, the load that receives a supply of power from one rechargeable battery in which the battery capacity is reduced cannot be operated. Each load does not always consume power at the same rate depending on a use situation of the electric device 1*a*, and therefore a possibility that such an imbalance of the battery capacities occurs cannot be eliminated. Further, when such an imbalance occurs, even if the battery capacity remains in either of the rechargeable batteries, there is a possibility that the entire electric device 1a cannot continue the operation. To solve the problem, the electric device 1a according to the present embodiment includes the third rechargeable circuit 15 in order to eliminate the imbalance of the battery capacities between the rechargeable batteries. In a case in which the battery capacity of one rechargeable battery is reduced and the battery capacity of the other rechargeable battery remains at some level, the third rechargeable circuit 15 charges the rechargeable battery whose battery capacity has been reduced by using power supplied from the rechargeable battery in which the battery capacity remains. The process permits the imbalance of the battery capacities between the rechargeable batteries to be eliminated. Hereinafter, the charging mutually performed between the first rechargeable battery 11 and the second rechargeable battery 12 as described above is referred to as an inter-battery charging.

To implement the inter-battery charging, the third rechargeable circuit 15 has both functions of stepping up and stepping down. For example, a well-known DC/DC converter with the circuit configuration not changed and the control content changed can be used for both of the stepping up and the stepping down. By using the above characteristics, the third rechargeable circuit 15 implements both of control to step down the power supplied from the first rechargeable battery 11 and charge the second rechargeable battery 12 and control to step up the power supplied from the second rechargeable battery 12 and charge the first rechargeable battery 11.

Note that, here, it is assumed that the load is connected one by one to the first power source circuit 19 and the second power source circuit 20, respectively; however, not limited thereto, each power source circuit may supply power to a plurality of loads in which the operating voltages are different from each other. In the case, the power source circuits supply power stepped down in accordance with the respective connected loads.

The control circuit 22 controls operations of each circuit within the electric device 1a. Specifically, in the present embodiment, the control circuit 22 is connected to the first rechargeable circuit 13, the second rechargeable circuit 14, the third rechargeable circuit 15, the first capacity calculation circuit 16, and the second capacity calculation circuit 17. Note that, in FIG. 1, signal lines for implementing the above connections are omitted. The control circuit 22 acquires information regarding the battery capacity of each rechargeable battery from the first capacity calculation circuit 16 and the second capacity calculation circuit 17. In addition, the control circuit 22 monitors whether or not the external power supply is connected to the power source terminal 18. Further, the control circuit 22 may acquire detection results of a temperature sensor incorporated in the electric device 1a. Then, in accordance with the above information, the first rechargeable circuit 13, the second rechargeable circuit 14, and the third rechargeable circuit 15 are caused to operate to thereby control charge/discharge of the first rechargeable battery 11 and the second rechargeable battery 12.

Hereinafter, a specific example of the charging control by the first rechargeable circuit 13 and the second rechargeable circuit 14 when the external power supply is connected to the power source terminal 18 will be described.

When the external power supply is connected to the power source terminal 18, the control circuit 22 determines whether or not to charge the first rechargeable battery 11 and the second rechargeable battery 12, respectively, on the basis of various conditions described below. Then, the control circuit 22 instructs the rechargeable circuit connected to the rechargeable battery for which charging is determined to perform the charging. Specifically, the control circuit 22 selects any one of three kinds of charging modes in which both of the rechargeable batteries are charged, only one rechargeable battery is charged, and neither of the rechargeable batteries are charged, in accordance with operating conditions of the electric device 1a or charging conditions of each rechargeable battery. Then, the control circuit 22 causes the charging to be performed in accordance with the selected charging mode. Note that, in a case in which the charging is stopped to each rechargeable battery, the control circuit 22 switches off a switching device (specifically, the switching device Sw1 or Sw2) incorporated in the corresponding rechargeable circuit to thereby stop charging the rechargeable battery by the rechargeable circuit. Alternatively, in a case in which the charging is stopped to each rechargeable battery, the control circuit 22 may stop operations of the corresponding rechargeable circuit. In the case, the supply of power is performed to the first power source circuit 19 or the second power source circuit 20 via the switching device Sw1 or Sw2 from each rechargeable battery.

As a specific example of conditions for selecting the charging mode, the control circuit 22 may select a charging mode in accordance with the present operating mode of the electric device 1a. In this example, while the electric device 1a operates in an operating mode to be assumed that power consumption is small, the control circuit 22 charges both of the rechargeable batteries. By contrast, while the electric device 1a operates in an operating mode to be assumed that the power consumption is large, the control circuit 22 charges only one rechargeable battery. Further, in a case in which the electric device 1a operates in an operating mode in which maximum power is required, the control circuit 22 stops charging both of the rechargeable batteries and supplies all of power supplied from the external power supply to the first power source circuit 19 and the second power source circuit 20.

Further, the control circuit 22 may select a charging mode in accordance with power actually required by the load of the electric device 1a. In this example, the control circuit 22 estimates power W consumed by the load at that time by using measurement results by the first capacity calculation circuit 16 and the second capacity calculation circuit 17. Then, in a case in which a state where the power W is smaller than a first threshold Wth1 continues for a predetermined time, the control circuit 22 transits to a mode in which both of the rechargeable batteries are charged. By contrast, in a case in which a state where the power W is larger than a second threshold Wth2 continues for a predetermined time, the control circuit 22 transits to a mode in which both of the rechargeable batteries are not charged. Here, the second threshold Wth2 is a value that is larger than the first threshold Wth1. Further, in a case in which a state where the power W is larger than or equal to the first threshold Wth1 and is smaller than or equal to the second threshold Wth2 continues for a predetermined time, the control circuit 22 transits to a mode in which only one rechargeable battery is charged. Note that the first threshold Wth1 and the second threshold Wth2 that are used for determining whether or not to perform the transition between the above charging modes may have hysteresis. Further, the control circuit 22 may sample values of the power W at a predetermined time interval and calculate a moving average of the power W by using the values sampled over a certain period. Thereby, the control circuit 22 may determine whether or not the transition between the charging modes is performed by using a calculated value of the moving average. Here, the power W is estimated by using the measurement results by the first capacity calculation circuit 16 and the second capacity calculation circuit 17. Further, the power W may be calculated by using other methods such as a method of directly measuring an electric current flowing through the first power source circuit 19 and the second power source circuit 20.

Further, the control circuit 22 may monitor measurement results of a temperature within the electric device 1a by the temperature sensor and select a charging mode in accordance with a temperature θ. For example, in a case in which a state where the temperature θ is lower than a first threshold θth1 continues for a predetermined time, the control circuit 22 transits to a mode in which both of the rechargeable batteries are charged. By contrast, in a case in which a state where the temperature θ is higher than a second threshold θth2 continues for a predetermined time, the control circuit 22 transits to a mode in which neither of the rechargeable batteries are charged. Here, the second threshold θth2 is a value that is larger than the first threshold θth1. Further, in a case in which a state where the temperature θ is higher than or equal to the first threshold θth1 and is lower than or equal to the second threshold θth2 continues for a predetermined time, the control circuit 22 transits to a mode in which only one rechargeable battery is charged. Similarly to the threshold regarding the power W, the first threshold θth1 and the second threshold θth2 regarding the temperature θ may also have hysteresis. Further, the control circuit 22 may determine whether or not to perform the transition to the charging mode by using the moving average of the temperature θ.

In the above descriptions, in the mode in which only one rechargeable battery is charged, the control circuit 22 charges a rechargeable battery in which a capacity rate (rate of the present battery capacity to a full charge capacity) is lower. The capacity rate of each rechargeable battery can be calculated on the basis of information obtained from the first capacity calculation circuit 16 and the second capacity calculation circuit 17. As a result of charging the rechargeable battery in which the capacity rate is lower, in a case in which the capacity rate is higher than that of the other rechargeable battery by a predetermined value or more, the control circuit 22 changes the rechargeable battery to be charged. This allows both of the rechargeable batteries to be alternately charged such that a difference in the capacity rate between the first rechargeable battery 11 and the second rechargeable battery 12 is smaller than a predetermined value.

Note that various conditions for a change in the charging mode described above may be used in combination. For example, in a case in which any one of a plurality of conditions regarding the operating mode, power consumption, and temperature of the electric device 1a is satisfied, the control circuit 22 may change the charging mode. Alternatively, in a case in which all of the plurality of conditions are satisfied, the control circuit 22 may change the charging mode.

As described above, the control circuit 22 changes the charging mode in accordance with the operating conditions, temperature, or the like of the electric device 1a to thereby charge both of the rechargeable batteries while suppressing heat generation. To suppress the heat generation, in place of stopping charging one rechargeable battery, the control circuit 22 may perform control to reduce a charging current or supply current (for example, in the case of the first rechargeable circuit 13, Is1+Ib1) of each rechargeable circuit. The process permits heat generated by an operation of the rechargeable circuit to be suppressed.

Subsequently, a specific example of control of the inter-battery charging by the third rechargeable circuit 15 in a state in which the external power supply is not connected to the power source terminal 18 will be described. In the case of a state in which there is no difference in the battery capacities between the first rechargeable battery 11 and the second rechargeable battery 12, the inter-battery charging is not required to be performed. Further, the first power source circuit 19 and the second power source circuit 20 simply step down power supplied from the respective corresponding rechargeable batteries and supply the power to the respective corresponding loads. The control circuit 22 obtains information regarding the respective battery capacities of two rechargeable batteries and determines whether or not to require the inter-battery charging on the basis of the acquired information.

Specifically, in a state in which the power source terminal 18 is not connected to the external power supply and the loads are operated by power supplied from the respective rechargeable batteries, the control circuit 22 acquires a capacity rate P1 of the battery capacity of the first rechargeable battery 11 and a capacity rate P2 of the battery capacity of the second rechargeable battery 12 at regular time intervals. Then, in a case in which a difference between the capacity rate P1 and the capacity rate P2 is larger than or equal to a predetermined threshold Pth1, the control circuit 22 instructs the third rechargeable circuit 15 to charge the rechargeable battery in which the capacity rate is low by using the rechargeable battery in which the capacity rate is large. Thereby, the third rechargeable circuit 15 can perform the inter-battery charging such that a difference between the capacity rates in two rechargeable batteries is eliminated.

Specifically, when performing the inter-battery charging, the first rechargeable circuit 13 and the second rechargeable circuit 14 stop the operations of their own; however, the switching devices Sw1 and Sw2 switch the charging on. In a case in which the charging from the first rechargeable battery 11 to the second rechargeable battery 12 is performed, the third rechargeable circuit 15 performs the step-down control in accordance with the instruction from the control circuit 22. Through the process, an electric current flows in the second rechargeable battery 12 via the switching device Sw1, the third rechargeable circuit 15, and the switching device Sw2 from the first rechargeable battery 11, and the second rechargeable battery 12 is charged. By contrast, in a case in which the charging from the second rechargeable battery 12 to the first rechargeable battery 11 is performed, the third rechargeable circuit 15 performs step-up control in accordance with the instruction from the control circuit 22. Through the process, an electric current flows in the first rechargeable battery 11 via the switching device Sw2, the third rechargeable circuit 15, and the switching device Sw1 from the second rechargeable battery 12, and the first rechargeable battery 11 is charged.

In a case in which the external power supply is connected to the power source terminal 18 during performing the inter-battery charging, before the charging control is started by the first rechargeable circuit 13 and the second rechargeable circuit 14, the control circuit 22 first stops the control of the inter-battery charging by the third rechargeable circuit 15 such that control of both the rechargeable circuits does not compete against each other. Then, the charging control of each rechargeable battery by one or both of the first rechargeable circuit 13 and the second rechargeable circuit 14 is started.

Note that, in addition to determination conditions using the threshold Pth1 described above, the control circuit 22 may perform the inter-battery charging only in a case in which either of the capacity rates of the rechargeable batteries is smaller than or equal to the threshold Pth2. As a specific example, a case in which the threshold Pth1 is 10% and the threshold Pth2 is 50% will be described. In the case, in a case in which conditions of (P1+10%)≤P2 and P1≤50% are satisfied, the control circuit 22 performs the charging control by stepping up from the second rechargeable battery 12 to the first rechargeable battery 11. By contrast, in a case in which conditions of (P2+10%)≤P1 and P2≤50% are satisfied, the control circuit 22 performs the charging control by stepping down from the first rechargeable battery 11 to the second rechargeable battery 12.

The determination conditions of the threshold Pth2 are used as described above in order not to perform the inter-battery charging as far as possible. When the battery capacities remain sufficiently in the first rechargeable battery 11 and the second rechargeable battery 12 respectively, even if some imbalance occurs in both of the capacity rates, a problem that the electric device 1a is prevented from operating or the like is not caused. Therefore, until the capacity rate of the rechargeable battery in which the capacity rate is small is smaller than a predetermined value, the inter-battery charging is not performed. The process permits unnecessary inter-battery charging to be avoided.

Note, however, that in the case of an operation state in which the heat generation of the electric device 1a is relatively small such as a case in which the power supply of the electric device 1a is switched off or a case in which a standby mode is provided to the electric device 1a, determination using the threshold Pth2 is not performed. Further, the inter-battery charging may be forcibly performed to maintain a balance between the rechargeable batteries.

In addition to the determination conditions described above, on the basis of the conditions of the operating mode, power consumption, temperature, and the like of the electric device 1a, the control circuit 22 may determine whether or not to perform the inter-battery charging. For example, only while the electric device 1a operates in a predetermined operating mode in which the power consumption is assumed to be small, the control circuit 22 may perform the inter-battery charging. By contrast, while the electric device 1a operates in the predetermined operating mode in which the power consumption is assumed to be large, the control circuit 22 may forbid the inter-battery charging.

Further, in a case in which a state where the power W is smaller than a predetermined third threshold Wth3 continues for a predetermined time or more, the control circuit 22 allows the inter-battery charging to be performed. By contrast, in a case in which a state where the power W is larger than or equal to the third threshold Wth3 continues for a predetermined time or more, the control circuit 22 may forbid the inter-battery charging to be performed. Similarly to the first threshold Wth1 and the second threshold Wth2 described above, the third threshold Wth3 in this case may also have hysteresis. Further, the control circuit 22 may perform the determination to permit or forbid the inter-battery charging by using a value of the moving average of the power W.

Further, in a case in which a state where the temperature θ is lower than a predetermined third threshold θth3 continues for a predetermined time or more, the control circuit 22 allows the inter-battery charging to be performed. By contrast, in a case in which a state where the temperature θ is higher than or equal to the third threshold θth3 continues for a predetermined time or more, the control circuit 22 may forbid the inter-battery charging to be performed. Similarly to the above-described example, the third threshold θth3 in this case may also have hysteresis. Further, the control circuit 22 may perform the determination to permit or forbid the inter-battery charging by using a value of the moving average of the temperature θ.

As described above, by using the electric device 1a according to the present embodiment, a plurality of rechargeable batteries in which the full charge voltages are different from each other and a plurality of loads in which the operating voltages are different from each other are combined such that a potential difference between the output voltage of the rechargeable battery and the operating voltage of the load is made small as far as possible. Through the process, thermal loss due to stepping down of the power source circuit can be reduced. Further, by providing a configuration in which it is possible to perform the inter-battery charging, an imbalance of the battery capacities among the plurality of rechargeable batteries is eliminated. As a result, a case in which the battery capacity remains in one rechargeable battery but not in the other rechargeable battery and therefore the load cannot be operated can be prevented.

Second Embodiment

Hereinafter, an electric device 1b according to a second embodiment of the present invention will be described with reference to FIG. 2. In the present embodiment, as compared with the first embodiment, the third rechargeable circuit 15 does not exist. The function of the inter-battery charging implemented by the third rechargeable circuit 15 in the first embodiment is implemented by the second rechargeable circuit 14. In addition, in accordance with the above, the second embodiment differs from the first embodiment in a connection mode between the second rechargeable circuit 14 and the other circuits. However, configurations and functions of each circuit other than the above are the same as those of the first embodiment. Therefore, the same sign is given to a circuit having the same function as that of the first embodiment and detailed descriptions are omitted.

Hereinafter, a circuit configuration of the electric device 1b according to the second embodiment will be described with a focus on a difference from the first embodiment. In the present embodiment, the second rechargeable circuit 14 is not directly connected to the power source terminal 18 and the input side thereof is connected to the output side of the first rechargeable circuit 13. Specifically, the first rechargeable circuit 13 inputs the power supplied from the external power supply via the power source terminal 18 and/or the power supplied from the first rechargeable battery 11 to the first power source circuit 19, and at the same time, inputs the power also to the second rechargeable circuit 14. By contrast, similarly to the first embodiment, the second rechargeable battery 12 and the second power source circuit 20 are connected to the output side of the second rechargeable circuit 14.

In the present embodiment, the output voltage range of the first rechargeable battery 11 is higher than that of the second rechargeable battery 12. Therefore, the second rechargeable circuit 14 steps down and outputs power supplied from the first rechargeable circuit 13 to thereby charge the second rechargeable battery 12. Further, the second rechargeable circuit 14 supplies the power supplied from the first rechargeable circuit 13 or the second rechargeable battery 12 to the second power source circuit 20. Further, in the present embodiment, the second rechargeable circuit 14 steps up the power supplied from the second rechargeable battery 12 and supplies the power to the first rechargeable battery 11 via the switching device Sw1, if necessary. Through the process, it is possible to charge the first rechargeable battery 11 by using power accumulated in the second rechargeable battery 12. To make the above inter-battery charging possible, the second rechargeable circuit 14 according to the present embodiment corresponds to both of the step-up control and the step-down control similarly to the third rechargeable circuit 15 according to the first embodiment.

Hereinafter, a specific example of the charging control according to the present embodiment will be described. In a case in which the external power supply is connected to the power source terminal 18, on the basis of various conditions, the control circuit 22 charges the first rechargeable battery 11 and/or the second rechargeable battery 12 by using the power supplied from the external power supply. Here, similarly to the first embodiment, the control circuit 22 may select the charging mode on the basis of various conditions of the operating mode, power W, temperature θ, and the like of the electric device 1b.

Note that, in the present embodiment that differs from the first embodiment, even in a case in which only the second rechargeable battery 12 is charged, the first rechargeable circuit 13 exists on a power supply route from the external power supply up to the second rechargeable battery 12, and therefore the first rechargeable circuit 13 is required to be operated.

In the state in which the external power supply is not connected to the power source terminal 18, similarly to the first embodiment, in a case in which a difference in the capacity rates between the first rechargeable battery 11 and the second rechargeable battery 12 is generated, the inter-battery charging is performed. In a case in which the capacity rate P1 of the first rechargeable battery 11 is larger, by the threshold Pth1 or more, than the capacity rate P2 of the second rechargeable battery 12, for example, the control circuit 22 instructs the second rechargeable circuit 14 to charge the second rechargeable battery 12 by using the power supplied from the first rechargeable battery 11. Through the process, the second rechargeable circuit 14 performs the step-down control and charges the second rechargeable battery 12 by using an electric current flowing in the second rechargeable battery 12 via the switching device Sw1, the second rechargeable circuit 14, and the switching device Sw2 from the first rechargeable battery 11.

By contrast, in a case in which the capacity rate P2 of the second rechargeable battery 12 is larger, by the threshold Pth1 or more, than the capacity rate P1 of the first rechargeable battery 11, the control circuit 22 instructs the second rechargeable circuit 14 to charge the first rechargeable battery 11 by using the power supplied from the second rechargeable battery 12. Then, the second rechargeable circuit 14 steps up the output voltage from the second rechargeable battery 12 and outputs the voltage to a first rechargeable circuit 13 side. Through the process, the second rechargeable circuit 14 charges the first rechargeable battery 11 by using an electric current flowing in the first rechargeable battery 11 via the switching device Sw2, the second rechargeable circuit 14, and the switching device Sw1 from the second rechargeable battery 12.

In a case in which the external power supply is connected to the power source terminal 18 while the second rechargeable circuit 14 performs the step-up control as described above, when the first rechargeable circuit 13 directly starts an operation by using the power supplied from the external power supply, an output from the first rechargeable circuit 13 and that from the second rechargeable circuit 14 compete against each other. Therefore, in a case in which the connection of the external power supply is detected during the step-up control of the second rechargeable circuit 14, the control circuit 22 first stops the step-up control of the second rechargeable circuit 14 and switches the step-up control to the step-down control. Then, the control circuit 22 causes the first rechargeable circuit 13 to start an operation.

As described above, by using the electric device 1b according to the second embodiment, the equivalent functions can be implemented by a circuit configuration in which the number of parts is smaller as compared with the first embodiment.

Note that the embodiments of the present invention are not limited to the embodiments described above. In the above descriptions, for example, the switching devices Sw1 and Sw2 that switch the charging on/off are provided on the positive electrode side of each rechargeable battery; however, the switching devices may be disposed on the negative electrode side of the rechargeable battery. Further, in the above descriptions, the switching devices Sw1 and Sw2 are incorporated in the rechargeable circuit; however, not limited thereto. Each switching device may be disposed outside the rechargeable circuit. In addition, the circuit configuration of the electric device according to the embodiments of the present invention is not limited to the circuit configuration described above. Further, various configurations that exert the same function may be adopted. In the above descriptions, it is assumed that independent integrated circuits are adopted in each rechargeable circuit, each capacity calculation circuit, the control circuit, and the like, respectively. Further, all or a part of the functions may be implemented by one integrated circuit.

Further, in the above descriptions, it is assumed that two rechargeable batteries in which the output voltage ranges are different from each other are incorporated in the electric device. However, three or more rechargeable batteries may be incorporated in the electric device. In the case, a connection destination of the load is selected in accordance with the output voltage of each of the respective rechargeable batteries, and thereby thermal loss due to stepping down can be further reduced. Further, the inter-battery charging is performed for at least a part of the three or more rechargeable batteries. Through the process, a state in which the battery capacity of a particular rechargeable battery gets low earlier than those of the other rechargeable batteries can be avoided.

REFERENCE SIGNS LIST 1a, 1b Electric device
11 First rechargeable battery
12 Second rechargeable battery
13 First rechargeable circuit
14 Second rechargeable circuit
15 Third rechargeable circuit
16 First capacity calculation circuit
17 Second capacity calculation circuit
18 Power source terminal
19 First power source circuit
20 Second power source circuit
21a, 21b Load
22 Control circuit

The invention claimed is:

1. An electric device incorporating a first rechargeable battery and a second rechargeable battery that is lower, in a full charge voltage, than the first rechargeable battery, the electric device comprising:
    a first power source circuit stepping down a voltage output by the first rechargeable battery to a first voltage and outputting the first voltage;
    a second power source circuit stepping down a voltage output by the second rechargeable battery to a second voltage that is lower than the first voltage and outputting the second voltage;
    a rechargeable circuit performing recharging of the first rechargeable battery and the second rechargeable battery in response to command signals;
    a control circuit operating to produce the command signals to achieve a plurality of charging modes via the rechargeable circuit, including:
    a first charging mode when a power level drawn from at least one of the first power source circuit and the second power source circuit is below a first threshold, whereby recharging both the first rechargeable battery and the second rechargeable battery is permitted,
    a second charging mode when the power level drawn from at least one of the first power source circuit and the second power source circuit is above a second threshold, higher than the first threshold, whereby recharging neither of the first rechargeable battery and the second rechargeable battery is permitted, and
    a third charging mode when the power level drawn from at least one of the first power source circuit and the second power source circuit is above a the first threshold and below the second threshold, whereby recharging only one of the first rechargeable battery and the second rechargeable battery is permitted.

2. The electric device according to claim 1, wherein the rechargeable circuit operates to perform inter-battery charging between the first rechargeable battery and the second rechargeable battery.

3. The electric device according to claim 2, further comprising:
    a first battery capacity circuit operating to monitor a first battery capacity of the first rechargeable battery; and
    a second battery capacity circuit operating to monitor a second battery capacity of the second rechargeable battery,
    wherein the control circuit operates to determine whether or not to require the inter-battery charging in accordance with the first battery capacity of the first rechargeable battery and the second battery capacity of the second rechargeable battery.

4. The electric device according to claim 3, wherein the control circuit operates to determine whether or not to require the inter-battery charging in accordance with a difference between a first capacity rate of the first rechargeable battery and a second capacity rate of the second rechargeable battery.

5. The electric device according to claim 4 wherein:
    the first capacity rate is defined as a ratio of the first battery capacity to a full battery capacity of the of the first rechargeable battery; and
    the second capacity rate is defined as a ratio of the second battery capacity to a full battery capacity of the of the second rechargeable battery.

6. The electric device according to claim 5, wherein the control circuit operates to cause the inter-battery charging to one of the first rechargeable battery and the second rechargeable battery having a lower capacity rate when in the second charging mode.

7. The electric device according to claim 5, wherein the control circuit operates to cause the inter-battery charging in an alternating fashion to the first rechargeable battery and to the second rechargeable battery, such that a difference between the first capacity rate and the second capacity rate is below a predetermined threshold.

\* \* \* \* \*